(12) United States Patent
Guionnet et al.

(10) Patent No.: US 11,700,397 B2
(45) Date of Patent: Jul. 11, 2023

(54) METHOD FOR IMAGE PROCESSING AND APPARATUS FOR IMPLEMENTING THE SAME

(71) Applicant: ATEME, Velizy Villacoublay (FR)

(72) Inventors: Thomas Guionnet, Velizy Villacoublay (FR); Sébastien Herbreteau, Velizy Villacoublay (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 17/390,509

(22) Filed: Jul. 30, 2021

(65) Prior Publication Data

US 2022/0038748 A1    Feb. 3, 2022

(30) Foreign Application Priority Data

Jul. 30, 2020 (EP) .................................. 20305879

(51) Int. Cl.
*H04N 19/85* (2014.01)
*G06T 5/00* (2006.01)

(52) U.S. Cl.
CPC ............. *H04N 19/85* (2014.11); *G06T 5/002* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 7,680,356 B2 * | 3/2010 | Boyce | ..................... | G06T 5/002 |
| | | | | 348/607 |
| 11,206,418 B2 * | 12/2021 | Dupuis | ................ | H04N 19/182 |
| 11,218,696 B2 * | 1/2022 | Dorovic | ............... | H04N 19/523 |
| 11,265,563 B2 * | 3/2022 | Parois | ................... | H04N 19/80 |
| 11,350,104 B2 * | 5/2022 | Lavaud | ............... | H04N 19/172 |
| 2006/0082649 A1 * | 4/2006 | Gomila | ............... | H04N 19/117 |
| | | | | 348/E5.051 |
| 2006/0256871 A1 * | 11/2006 | Boyce | ................. | H04N 19/136 |
| | | | | 375/E7.161 |

(Continued)

FOREIGN PATENT DOCUMENTS

| WO | 2006/057994 | 6/2006 | | |
|---|---|---|---|---|
| WO | WO-2006057994 A2 * | 6/2006 | ............. | G06T 5/002 |

OTHER PUBLICATIONS

Byung Tae Oh, et al., "Advanced Film Grain Noise Extraction and Synthesis for High-Definition Video Coding", IEEE Transactions on Circuits and Systems for Video Technology, vol. 19, No. 12, Dec. 2009, pp. 1717-1729 (13 pages).

(Continued)

*Primary Examiner* — Reza Aghevli
(74) *Attorney, Agent, or Firm* — Nixon & Vanderhye

(57) ABSTRACT

A method of processing an image is proposed, which includes: determining, based on the image, one or more noise templates, wherein each of the one or more noise templates includes noise pixels representing noise contained in the image; calculating one or more first autocovariance values, based on the noise pixels of at least one of the one or more noise templates; based on the one or more first autocovariance values, selecting an entry of a noise model database among database entries which respectively include values of noise model parameters corresponding to a noise model.

14 Claims, 8 Drawing Sheets

(56) References Cited

U.S. PATENT DOCUMENTS

| | | | | |
|---|---|---|---|---|
| 2007/0047658 A1* | 3/2007 | Tourapis | ................ | H04N 19/85 |
| | | | | 348/E5.077 |
| 2007/0058866 A1* | 3/2007 | Boyce | ....................... | G06T 5/20 |
| | | | | 375/E7.19 |
| 2021/0343045 A1* | 11/2021 | Guionnet | ................ | G06T 5/009 |
| 2021/0344968 A1* | 11/2021 | Guionnet | ................ | G06T 5/002 |
| 2022/0014806 A1* | 1/2022 | Fretwell | ............... | H04N 21/442 |
| 2022/0191501 A1* | 6/2022 | Guionnet | ............. | H04N 19/615 |

OTHER PUBLICATIONS

Extended European Search Report for EP Application No. 20305879.7 dated Dec. 2, 2020, 12 pages.

\* cited by examiner

| $X_{i,j}$ | $X_{i+1,j}$ | $X_{i+2,j}$ | $X_{i+3,j}$ |
|---|---|---|---|
|  | $X_{i+1,j+1}$ | $X_{i+2,j+1}$ | $X_{i+3,j+1}$ |
|  |  | $X_{i+2,j+2}$ | $X_{i+3,j+2}$ |
|  |  |  | $X_{i+3,j+3}$ |

METHOD FOR IMAGE PROCESSING AND APPARATUS FOR IMPLEMENTING THE SAME

CROSS-REFERENCE TO RELATED APPLICATIONS

This application claims priority benefit under 35 U.S.C. § 119(d) from European Patent Application No. EP 20 305 879, filed Jul. 30, 2020, the disclosure of which is incorporated by reference herein in its entirety.

FIELD OF THE INVENTION

The present disclosure relates to the field of image processing, in particular image encoding for video stream compression.

BACKGROUND OF THE INVENTION

Film grain is usual in old motion pictures dating from the times movies were shot with a film camera. The grain, which was a result of chemical effects of the analog film used in the film camera, is no longer present in videos captured with a digital camera. Nevertheless it is common for film makers to add computer-generated grain in materials captured with a digital camera in order to reproduce the esthetic of old movies through the presence of film grain. In view of its random nature, grain present in an image can be modeled as an additive noise, and processed as such.

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

Even though grain may have been added in post-production to a video content, such film grain is considered as part of the video data to be encoded or compressed likewise other components of the video data. However, due to its random nature, grain is difficult to compress with a good efficiency.

With a known video coding or compression scheme, preserving the grain requires a very high bitrate. Conversely, when using a reasonable bitrate, say for a broadcast use case, grain cannot be preserved properly. It is either washed out, or partly removed thus generating undesirable visual artefacts and temporal instability.

Therefore it is desirable to improve the efficiency of video encoding/compression of video data that includes grain by preserving the grain information during the encoding/compression, while preserving performance of the encoder (encoding gain).

There is therefore a need for providing an improved video processing scheme and video encoder and/or decoder implementing the same that address at least some of the above-described drawbacks and shortcomings of the conventional technology in the art.

It is an object of the present subject disclosure to provide an improved video processing scheme and apparatus implementing the same.

Another object of the present subject disclosure is to provide an improved video encoding or compression and/or video decoding or decompression scheme and apparatuses implementing the same.

Another object of the present subject disclosure is to provide an improved video encoding and/or decoding scheme and apparatuses implementing the same for alleviating the above-described drawbacks and shortcomings of conventional video encoding/decoding schemes, in particular with respect to video encoding/decoding schemes of an input video stream to be encoded that contains film grain and/or random noise.

SUMMARY OF THE INVENTION

To achieve these objects and other advantages and in accordance with the purpose of the present subject disclosure, as embodied and broadly described herein, in one aspect of the present subject disclosure, a method of processing an image, a digital video frame, or more generally digital video data, is proposed. The proposed method comprises: determining, based on the image, one or more noise templates, wherein each of the one or more noise templates comprises noise pixels representing noise contained in the image; calculating one or more first autocovariance values, based on the noise pixels of at least one of the one or more noise templates; and based on the one or more first autocovariance values, selecting an entry of a noise model database among database entries which respectively comprise values of noise model parameters corresponding to a noise model.

Depending on the embodiment, the values of the noise model parameters corresponding to the selected entry may be used to characterize the noise contained in the image to be used for further processing of the image.

For example, the noise characterization obtained through the proposed method may be used for purposes of performing an analysis (e.g. a noise analysis) of the image. Such noise characterization may also be used for purposes of encoding the image.

In one or more embodiments, the proposed method may further comprise: obtaining, for each entry of the database to be searched, one or more second autocovariance values, based on noise pixels representing one or more database noise templates corresponding to the values of noise model parameters comprised in the entry.

In one or more embodiments, the one or more second autocovariance values may be pre-calculated, and comprised in data stored in the entry.

In one or more embodiments, the selecting the entry of the noise model database may be based on a comparison of the one or more first autocovariance values with the one or more second autocovariance values.

In one or more embodiments, the proposed method may further comprise: comparing the one or more first autocovariance values with the one or more second autocovariance values based on a distance between the one or more first autocovariance values and the one or more second autocovariance values.

In one or more embodiments, the noise model may be configured to model grain contained in the image.

In one or more embodiments, the proposed method may be performed at an encoder configured for encoding the image, and each of the one or more noise templates may be of a predetermined pixel size smaller than the pixel size of the image, and the predetermined pixel size of the noise template may be chosen corresponding to the pixel size of a noise synthesis template used at a decoder to synthesize noise based on the noise model using the noise model parameters.

In one or more embodiments, the predetermined pixel size of the noise template may be chosen to be 64×64.

In one or more embodiments, the proposed method may be performed at an encoder configured for encoding the image, and may further comprise: generating a set of denoised image pixels, based on the noise model parameters comprised in the entry selected in the noise model database.

In one or more embodiments, the one or more noise templates may be determined for pixels of the image corresponding to respective values of planes (Y, Cb, Cr), each representing luminance or chrominance of pixels.

In one or more embodiments, the proposed method may further comprise: normalizing one or more of the noise templates based on which first autocovariance values are calculated, prior to calculating the first autocovariance values, by dividing their noise pixels by a standard deviation calculated on their basis.

In one or more embodiments, each of the database entries may comprise values of noise model parameters associated with one or more of (Y, Cb, Cr) planes representing luminance or chrominance of pixels.

In one or more embodiments, the noise model may be an auto-regressive, AR, parametric noise model, the noise model parameters may comprise AR parametric noise model parameters, and each of AR parametric noise model noise pixels representing a database noise template among the one or more database noise templates corresponding to the values the AR parametric noise model parameters may be computable based on a combination of a linear combination of previous noise pixels in a causal neighborhood of the AR parametric noise model noise pixel weighted by respective AR model linear combination parameters ($\varphi_1, \ldots, \varphi_P$) with a generated noise sample corresponding to an additive Gaussian noise of AR model variance parameter (a) and using a seed parameter of a pseudo-random number generator.

In one or more embodiments, respective AR parametric noise model second autocovariance values for the database noise template may be obtained for one or more of (Y, Cb, Cr) planes representing luminance or chrominance of pixels, and the entry of the noise model database may be selected based on similarity estimates respectively representing, for each of the one or more of (Y, Cb, Cr) planes representing luminance or chrominance of pixels, a similarity between the one or more first autocovariance values and the one or more second autocovariance values.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a video encoder is proposed, which is configured to encode video content comprising a plurality of images, an comprises an apparatus as proposed configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in embodiments, the present subject disclosure provides a non-transitory computer-readable medium encoded with executable instructions which, when executed, causes an apparatus comprising a processor operatively coupled with a memory, to process an image, a digital video frame, or more generally digital video data, by performing the determining, based on the image, one or more noise templates, wherein each of the one or more noise templates comprises noise pixels representing noise contained in the image; calculating one or more first autocovariance values, based on the noise pixels of at least one of the one or more noise templates; and based on the one or more first autocovariance values, selecting an entry of a noise model database among database entries which respectively comprise values of noise model parameters corresponding to a noise model.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed.

In another aspect of the present subject disclosure, a data set representing, for example through compression or encoding, a computer program as proposed herein, is proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIG. 8 illustrates a set of pixels based on which autocovariance values may be calculated according to one or more embodiments.

DETAILED DESCRIPTION OF THE DRAWINGS

Figure 1:
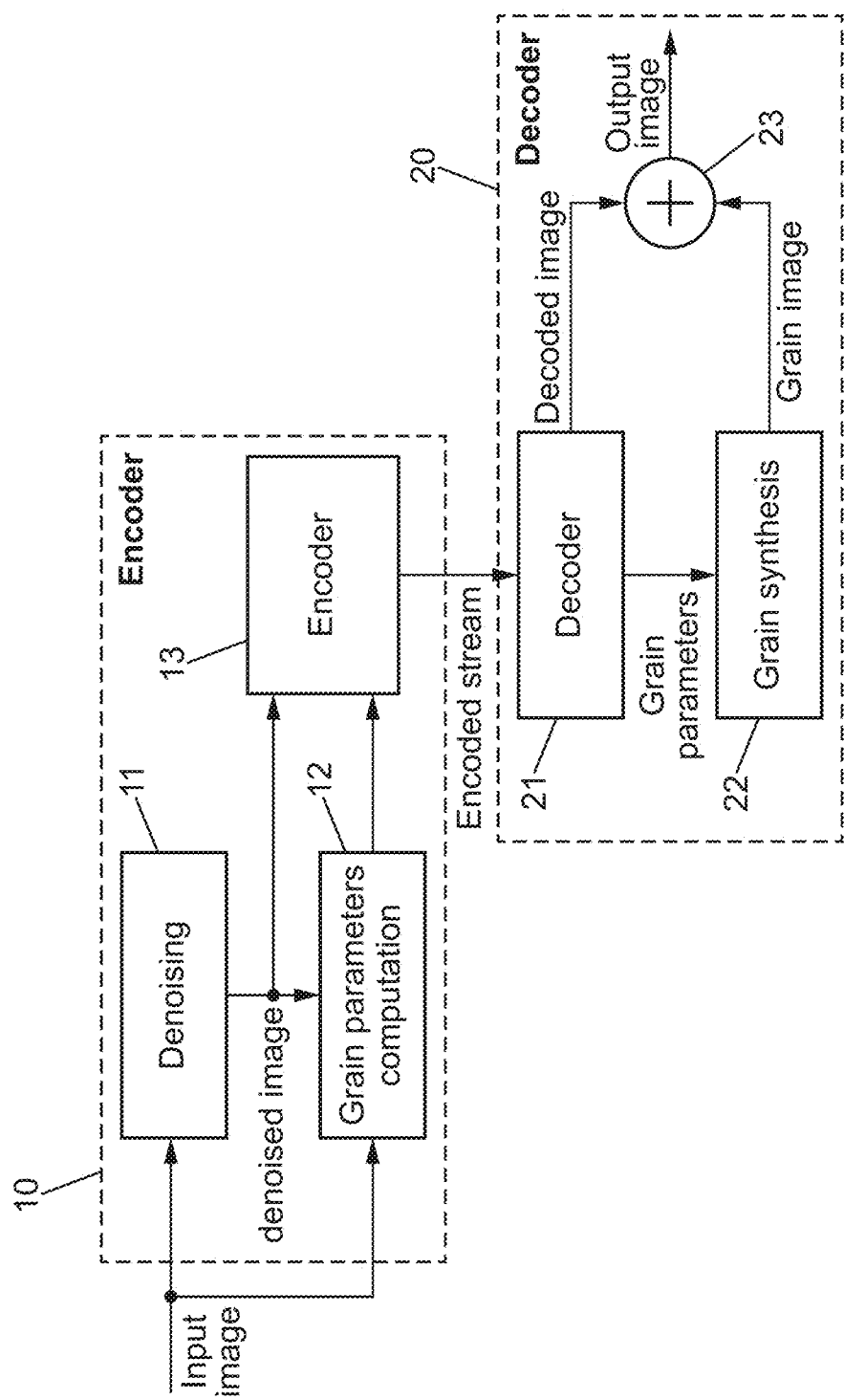
FIG. 1 is a block diagram illustrating an exemplary image encoder/decoder system on which the proposed methods may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fibre, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, byway of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

In the present description, the terms "terminal", "user equipment", "reader", "reading device", "reading terminal" and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols, and interoperate with larger networks. Various types of equipment may be used to make various architectures or various protocols interoperable. For example, a router may be used to provide a communication link or a data link between two LANs that would otherwise be separate and independent.

As used herein, the term "pixel" means a picture element or an elementary component of an image, which may be represented by a numeric value, e.g. a natural integer value. A pixel of a digital image may be coded digitally, and its value may be coded into a bitstream. Further, a pixel of an image may represent image data according to color spaces, such as the Y, Cb and Cr color spaces, wherein Y is a luma component of the pixel (also called a luma pixel or a luma sample), and $C_b$ and $C_r$ are the blue-difference and red-difference chroma components of the pixel. Two channel types may also be distinguished for a pixel: a luma channel type, corresponding to the luma component of the pixel, and a chroma channel type, jointly designating the chroma components of the pixel. The chroma channel type pixel may itself be divided into the blue-difference (Cb) chroma component and the red-difference (Cr) chroma component. In the following, the term "plane" may be used to refer to, depending on the implementation, a color space, a channel type, or a component of the pixel to which all or part of the proposed method may be applied. For example, processing a pixel in the luma plane may correspond to processing a luma component of the pixel (typically associated with a so-called "luminance plane", referred to as the "Y" plane), while processing the pixel in a chroma plane may correspond to processing a chroma component of the pixel (two chrominance planes being generally used and referred to as the "U" and "V" planes, or "Cb" and "Cr" planes). In the following, unless stated otherwise, an operation described as applicable to a pixel may be applied to any pixel component, whether chroma or luma, that is, regardless of whether the pixel represents a luma component or a chroma component of a three-color component pixel. In the following, some embodiments of the proposed methods, apparatuses and computer programs are described for the exemplary processing of pixels of an image in the Y, Cb, and/or Cr planes. However, it will be appreciated by those having ordinary skill in the relevant art that other color spaces, such as, for example, the YUV, Y'CbCr, or RGB color spaces, may be used in place of or in addition to the set of YCbCr color spaces, which is given by way of example only according to embodiments of the present subject disclosure.

The methods proposed in the present subject disclosure may be implemented by any video encoder, video decoder, or video codec configured for encoding and/or decoding images (or frames) of input video data containing grain, film grain and/or noise, such as, for example a video encoder and/or decoder compliant with any of the H.261, MPEG-1 Part 2, H.262, MPEG-2 Part 2, Alliance for Open Media (AOM) AV1, H.264/AVC, H.265/HEVC, MPEG-4 Part 2, SHVC (Scalable HEVC), H.266/VVC, and MPEG-5 EVC specifications or standards, whether in their existing versions and/or their evolutions, as the case may be adapted for implementing one or more embodiments of the proposed methods.

In the following, embodiments of the proposed methods, apparatuses and computer programs are described for the exemplary processing of grain in an image. However, it will be appreciated by those having ordinary skill in the relevant art that other types of noise in images or videos, such as, for example, sensor noise, may be processed in place of or in addition to the grain noise which is given by way of example only according to embodiments of the present subject disclosure.

In some conventional encoding/decoding schemes, such as specified for the AV1 video codec specified by the Alliance for Open Media (AOM), the grain information of an input image (for example of an input video) is not directly encoded, together with other data in the input image, but instead processed using an analysis/synthesis processing.

Using an analysis/synthesis method allows compressing grain through a parametric model. Once analyzing grain information in an input image has provided estimates of grain parameters, the grain can be removed from the input image prior to encoding such image using the chosen encoding scheme (e.g. AV1). The process of removing the grain is sometimes referred to as "denoising", and the image, video, or content from which the grain has been removed is referred to as "denoised". The efficiency of the encoding scheme can be preserved by only encoding the denoised input image or video, while the encoded stream resulting from the encoding of the input image or video comprises the compressed or encoded image or video, together with the corresponding grain parameters.

FIG. 1 shows an exemplary image encoder/decoder system which uses denoising of its input data prior to encoding such data.

Shown on FIG. 1 is an encoder 10 which comprises a denoising engine 11, a grain parameters computation engine 12, and an encoder engine 13. The encoder 10 is configured to receive an input image, which is provided as input to the denoising engine 11 and to the grain parameters computation engine 12. The denoising engine 11 is configured for removing the grain from the received input image data, which results in a generated denoised image. The denoised image is provided to the grain parameters computation engine 12 which is configured to, based on the input image data and the denoised input image data, compute grain parameters for the grain comprised in the input image data. The computation of grain parameters values or estimates can use an analysis part of an analysis/synthesis scheme operating on a model of the grain/noise, for example an auto-regressive parametric model.

As shown on FIG. 1, the denoised image is provided as input to the encoder engine 13, which also receives as input estimates of grain parameters computed by the grain parameters computation engine 12. The encoder engine 13 can be configured to process (e.g. encode or compress) the received denoised image data according to any image and/or video encoding scheme, such as, for example a video encoder compliant with any of the H.261, MPEG-1 Part 2, H.262, MPEG-2 Part 2, AV1, H.264/AVC, H.265/HEVC, MPEG-4 Part 2, SHVC (Scalable HEVC), and H.266/VVC, and MPEG-5 EVC standards. As a result, the encoder engine 13 may produce an encoded stream which comprises grain parameters estimates received from the grain parameters computation engine and encoded image data generated by itself based on the received denoised image. As a consequence, only the denoised video is compressed and sent to a channel along with the grain parameters.

Also shown on FIG. 1 is a decoder 20 which comprises a decoder engine 21 and a grain synthesis engine 22. The decoder engine 21 is configured to receive as input data the encoded stream produced by the encoder 10, and decode the encoded image data comprised in the encoded stream to generate a decoded image. The decoded image data is therefore generated based on the encoded image data resulting from the encoding of the denoised image. The decoder engine 21 may also be configured to extract from the received encoded stream grain parameters data, and provide such grain parameters data to the grain synthesis engine. The grain synthesis engine 22 is configured to, based on the grain parameters data, generate image grain data that correspond to the decoded image produced by the decoder engine 21. The computation of image grain data can use a synthesis part of the analysis/synthesis scheme operating on a model of the grain/noise that was used by the grain parameters computation engine 12 of the encoder. The decoded image data generated by the decoder engine 21 and the image grain data generated by the grain synthesis engine 22 are combined 23 to generate an output image which is output by the decoder 20.

That is, at the decoder side, the denoised image is decoded, and a synthetic noise pattern (e.g. a synthetic grain pattern) is generated based on the grain parameters estimated at the encoder side and combined with (for example added to) the decoded image. Therefore, contrary to the principles of image encoding/decoding which are based on fidelity of the decoded image to the input image to be encoded, the resulting noisy or grainy image or video is different from the source, while still being visually similar.

Some standard video codec specifications, such as, for example, the AV1 codec specification, define a syntax of grain parameters and specify a grain synthesis scheme to be used as normative/mandatory tools. As another example, the H.264/AVC standard defines an optional syntax for sending grain parameters along with encoded video data. In AV1 an auto-regressive model is considered, while in AVC/H.264, two different models are proposed, including an auto-regressive model.

Even though the following focuses on a non-limiting example based on the AV1 specification, a person of ordinary skill in the art would understand that the proposed processes, apparatuses and computer programs of the present subject disclosure may be implemented based on any video or image processing or coding standard or specification which addresses noise and/or grain processing in an image, in particular through a noise analysis/synthesis model, such as, for example, an auto-regressive (AR) model, and that such proposed processes, apparatuses and computer programs of the present subject disclosure are not limited to the use of any specific video or image processing or coding standard/specification, and in particular to AV1, which is provided as an example only. For example, the proposed processes, apparatuses and computer programs of the present subject disclosure may also be implemented using the AVC/H.264 auto-regressive model.

Further, even though the following focuses on a non-limiting example based on the AV1 specification which uses an AR parametric model, a person of ordinary skill in the art would understand that the proposed processes, apparatuses and computer programs of the present subject disclosure may be implemented based on any analysis/synthesis model suitable for modelling noise (e.g. grain), and that such proposed processes, apparatuses and computer programs of the present subject disclosure are not limited to the use of any specific noise model, and in particular to an AR parametric model for noise, which is provided as an example only.

In the present subject disclosure, reference is made to the AV1 specification which is available at the URL https://aomediacodec.github.io/av1-spec/av1-spec.pdf, and incorporated by reference in its entirety in the present subject disclosure.

As part of the analysis/synthesis scheme used therein for grain processing, the AV1 video codec specifications consider an auto-regressive (AR) process for modeling a film grain pattern of an input image, according to which each noise pixel is modelled by a random variable based on the noise pixels in a causal neighborhood. In AVC/H.264, two models are proposed, including an auto-regressive model. The grain model specified for AV1 assumes that each input video frame can be modelled as a combination (e.g. an addition) of a signal without noise and a noise frame (also referred to as a noise image) corresponding to a zero-average noise that follows an AR process. Each pixel of the noise frame can be modelled by a random variable which depends on random variables respectively associated with previously generated neighboring pixels of the noise frame.

Figures 2, 3:
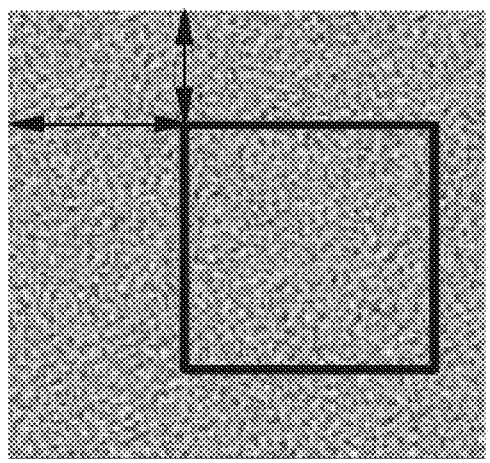
FIG. 2 illustrates an AR model with a lag L=2 that can be used to represent a noise pixel of a noise frame.
FIG. 3 illustrates the selection of a patch (e.g. of size 32×32 pixels) at random coordinates in a grain template.

FIG. 2 illustrates an AR model with a lag L=2 that can be used to represent a noise pixel of a noise frame.

FIG. 2 shows an array of noise pixels comprised in a noise frame, wherein each noise pixel is represented by a respective random variable X. For example, a current noise pixel at position (i,j) in the array is represented by the random variable $X_{i,j}$. According to an AR model with lag L=2 (as illustrated in FIG. 2), the random variable representing the noise pixel of interest may be expressed as a linear combination of previously synthesized pixels of a predefined neighborhood (in the example of FIG. 2, all previously synthesized pixels that are distant from the current pixel by two positions on the left and/or on the top of the current pixel) combined with a parameter corresponding to a Gaussian noise sample:

$$X_{i,j}=\varepsilon_{i,j}+\varphi_1 X_{i,j-1}+\varphi_2 X_{i,j-2}+\varphi_3 X_{i-1,j+2}+\varphi_4 X_{i-1,j+1}+\varphi_5 X_{i-1,j}+\varphi_6 X_{i-1,j-1}+\varphi_7 X_{i-1,j-2}+\varphi_8 X_{i-2,j+2}+\varphi_9 X_{i-2,j+1}+\varphi_{10} X_{i-2,j}+\varphi_{11} X_{i-2,j-1}+\varphi_{12} X_{i-2,j-2},$$

wherein $\varphi_1, \ldots, \varphi_p$ are the auto-regressive parametric noise model linear combination parameters, and $\varepsilon_{i,j}$ a random number following an independent identically distributed gaussian distribution of standard deviation σ. Another parameter of the AR parametric noise model that may be used is one or more seeds of the pseudo-number generator usable for generating the random number $\varepsilon_{i,j}$. In some embodiments, the seed may be chosen at the encoder side and transmitted along with the auto-regressive parametric noise model linear combination parameters $\varphi_1, \ldots, \varphi_p$ and the standard deviation a, to be used at the decoder side with a pseudo-random number generator, for example as specified by the AV1 codec specification.

In one or more embodiments, the parameters of the AR parametric noise model may therefore include the number P of linear combination coefficients ($\varphi_1, \varphi_2, \ldots, \varphi_P$), linear combination coefficients ($\varphi_1, \varphi_2, \ldots, \varphi_P$), a standard deviation a or variance of the Gaussian noise to be used for drawing the random number $\varepsilon_{i,j}$, and a seed value.

Based on these parameters, a current pixel value $X_{i,j}$ may be generated by adding a random value of a Gaussian noise of standard deviation a (generated based on the seed value) to a linear combination of the P pixel values previously generated for the P pixels in the causal neighborhood weighted by the linear combination coefficients ($\varphi_1, \varphi_2, \ldots, \varphi_P$).

The grain synthesis algorithm specified for AV1 has been defined with computing efficiency in mind. The computing cost of synthesizing a full-size grain image can indeed become high in the case of processing an ultra HD image. As such, the AV1 specification for grain synthesis at the decoder does not require generating grain pixels for the full pixel size of the image (or video frame) under consideration. Instead, a noise template (which may also be referred to as a noise "pattern") of a predetermined and smaller size than that of the image, e.g. of size 64×64 pixels, may be generated, and used as a template for generating noise patches of a smaller size, such as 32×32 pixels. A plurality of noise patches may be chosen at random coordinates in the 64×64 pixels noise template, and copied on the image which will have been previously divided into blocks of the same size as the noise patches (e.g. blocks of 32×32 pixels). FIG. 3 illustrates the selection of a patch (e.g. of size 32×32 pixels) at random coordinates in a grain template (e.g. of size 64×64 pixels).

Therefore, advantageously, the noise of an image to be processed may be analyzed based on a noise template of a smaller size than that of the image, in order to lower the processing time and/or complexity of this aspect of the processing. For example, the noise of an image may be analyzed based on an analysis scheme applied to one or more 64×64 pixel noise templates determined based on the image.

Figure 4:
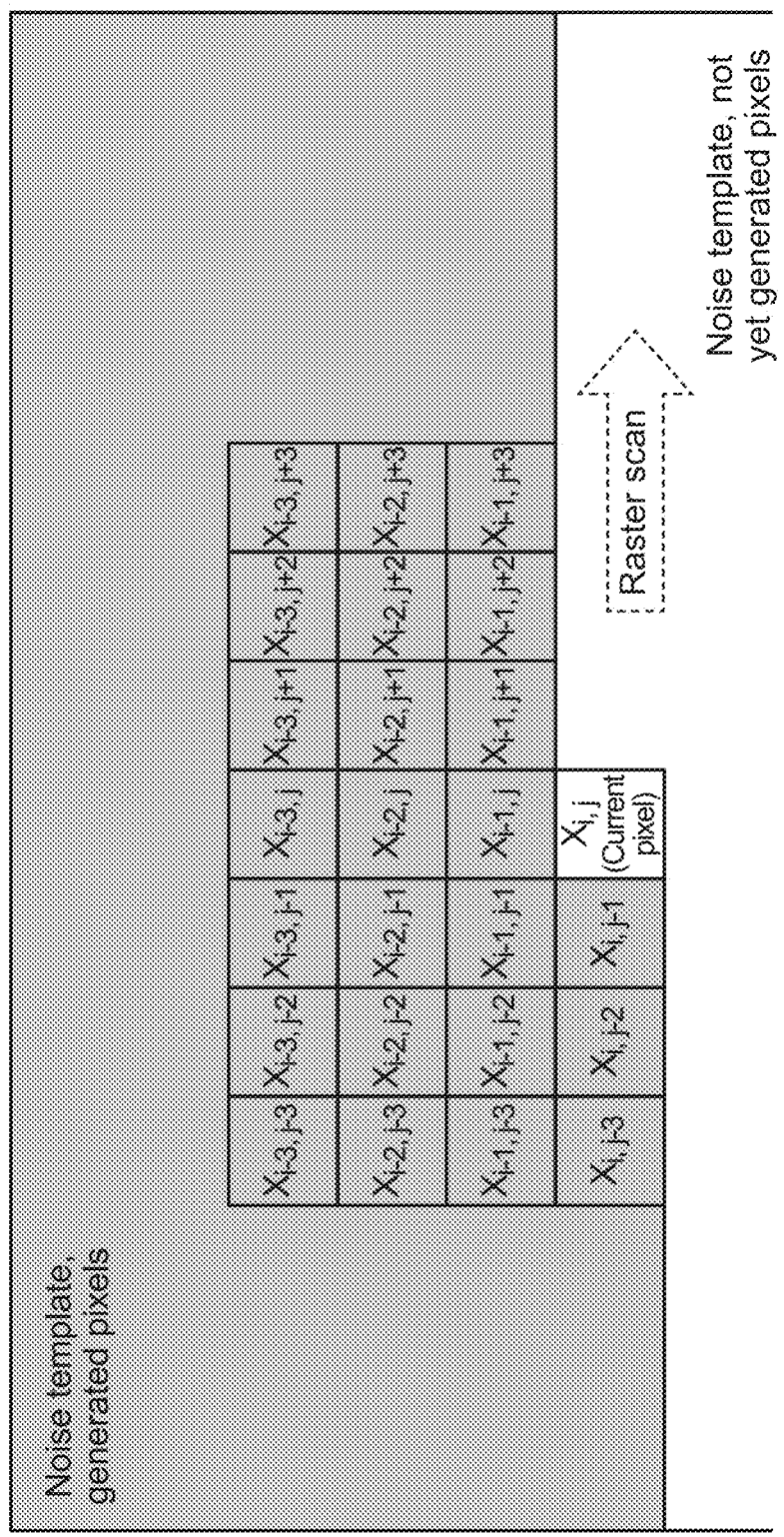
FIG. 4 illustrates an exemplary process of successively generating grain pixels in a template.

FIG. 4 illustrates an exemplary process of successively generating grain pixels in the template with the largest possible pixel neighborhood (corresponding to a lag L=3) for an autoregressive model, for example as defined by the AV1 specifications.

As illustrated on FIG. 4, a current noise pixel represented by a random variable $X_{i,j}$ may be computed according to a lag L=3 AR model based on the values of random variables representing pixels in the neighborhood of the current pixel located in the array of noise pixels represented on FIG. 4 at a distance of up to 3 pixels from the current pixel.

A processing sequence for grain processing, at the encoder (analysis) or at the decoder (synthesis), the grain pixels of the image may define a sequence according to which grain pixels are analyzed/synthesized one after another. Because the pixels of the image may be analyzed at the encoder according to a predetermined sequence to determine the grain model parameters, the grain pixels may be synthesized at the decoder according to the same processing sequence. For example, a raster scan sequence may scan the pixels of the image starting from the pixel located at the leftmost upper corner of the image (represented by a pixel matrix), and progress to the pixel adjacent to the previously scanned pixel located to the right. At the end of a line of pixels, the sequence proceeds to the next line scanning the pixels from the left to the right. An image divided into blocks may be scanned in the same manner, with blocks being processed according to the processing sequence instead of pixels.

As discussed above, a noise template can therefore be progressively generated according to a processing sequence of grain analysis/synthesis, such as a raster scan sequence as illustrated on FIG. 4.

Further, the AV1 specifications provide that the grain parameters can be adjusted as a function of the luminance, to better model the behavior of actual film grain. For instance, film grain tends to be less prominent at high luminance, compared to medium luminance. AV1 allows specifying several luminance intervals and then send a scaling factor per luminance interval, from which a piecewise linear scaling function can be obtained. Although not specifically mentioned in the remaining of this document, the proposed methods, apparatuses and computer programs are compatible with this feature.

Although the above-described analysis/synthesis scheme provides a good solution to the grain compression problem, the synthesis algorithm defined in the AV1 specification has some drawbacks due to the use of a noise template based on which a grain image is generated by pixel-copying of noise patches randomly selected in the noise template.

According to the AV1 grain image synthesis scheme, 32×32 pixels grain patches are repeatedly selected in a 64×64 pixels grain template. The use of these patches selected from a template of synthesized grain pixels greatly reduces the computing cost of synthesizing the grain image, in particular when it comes to generating a grain image corresponding to an image with a large pixel number, such as an ultra HD image. However, the repeated selection of 32×32 pixel patches within a 64×64 template which is only twice as large, even though random, will lead to selected 32×32 pixel patches that tend to often contain the central portion of the 64×64 template. This may create structured pattern in the grain image which is generated from all the selected 32×32 patches. Even though it has been randomly generated, the noise template may include one or more structured patterns. Further, even though these structured patterns may not be very visible in the noise template, their repetitions in the final decoded image with synthesized noise will render them visible. As the repetition of a structured pattern in the reconstructed image at the decoder is easily identifiable by a human viewer, the generated noise may in some cases not have the expected visual quality, i.e. the "random feeling". Therefore the grain analysis/synthesis scheme specified in AV1 may introduce structured patterns in the grain image that may deteriorate the visual quality of the reconstructed image.

Figure 5:
FIG. 5 is an exemplary image which illustrates the structured aspect of the grain generated according to the method specified in the AV1 specification.
Figure 6:
FIG. 6 is an exemplary image processed in accordance with one or more embodiments.

An example of this visual deterioration is provided by FIGS. 5 and 6. While the example of FIG. 5 illustrates the structured aspect of the grain generated by the AV1 method, the example of FIG. 6 does not follow the AV1 method, and the visual aspect is much more pleasing.

The present subject disclosure provides image analysis methods that address this problem of structured patterns present in the grain of a decoded image, and aim at avoiding or limiting repetitive patterns appearance when using AV1 grain synthesis method, while keeping a similar computation complexity. The proposed methods may therefore advantageously be used for image analysis (noise analysis) or encoding of an ultra HD image.

In addition, various methods have been developed for estimating the grain parameters when using an AR model for the grain, that is, estimating the AR model parameters (including the AR model linear combination parameters ($\varphi_1, \ldots, \varphi_P$) and AR model variance parameter ($\sigma$)). For example, the Yule-Walker method may be used, as this method is well suited for the estimation of AR model parameters, its complexity is reasonable, and it usually provides satisfactory results.

However, the Yule-Walker method has been developed in the context of one-dimensional (1D) signals, so that its performance is well-known when implemented on 1D signals. Such is not the case for two-dimensional (2D) signals, which is the situation at hand when processing additive noise signals (such as grain) in images.

Mathematical proofs of convergence of the Yule-Walker method towards a solution have been proposed in the context of 1D signal processing. These methods cannot be directly transposed for 2D signal processing, so that the risk of divergence of the Yule-Walker method when used for estimating grain model parameters in an image needs to be taken into account.

For example, parameters estimated by the Yule-Walker method, although usable, may lead to the generation of a divergent grain pattern, that is, a grain pattern exhibiting continuously increasing oscillations and a standard deviation much higher than the standard deviation of the source grain.

It is desirable to avoid this situation of divergence in practical applications, as it might render the final decoded image completely saturated, which may amount to a complete loss of the image data.

In order to address the above-mentioned problems, the present subject disclosure provides an improved method of performing a noise analysis on an image (for example for purposes of encoding the image).

Figure 7A:
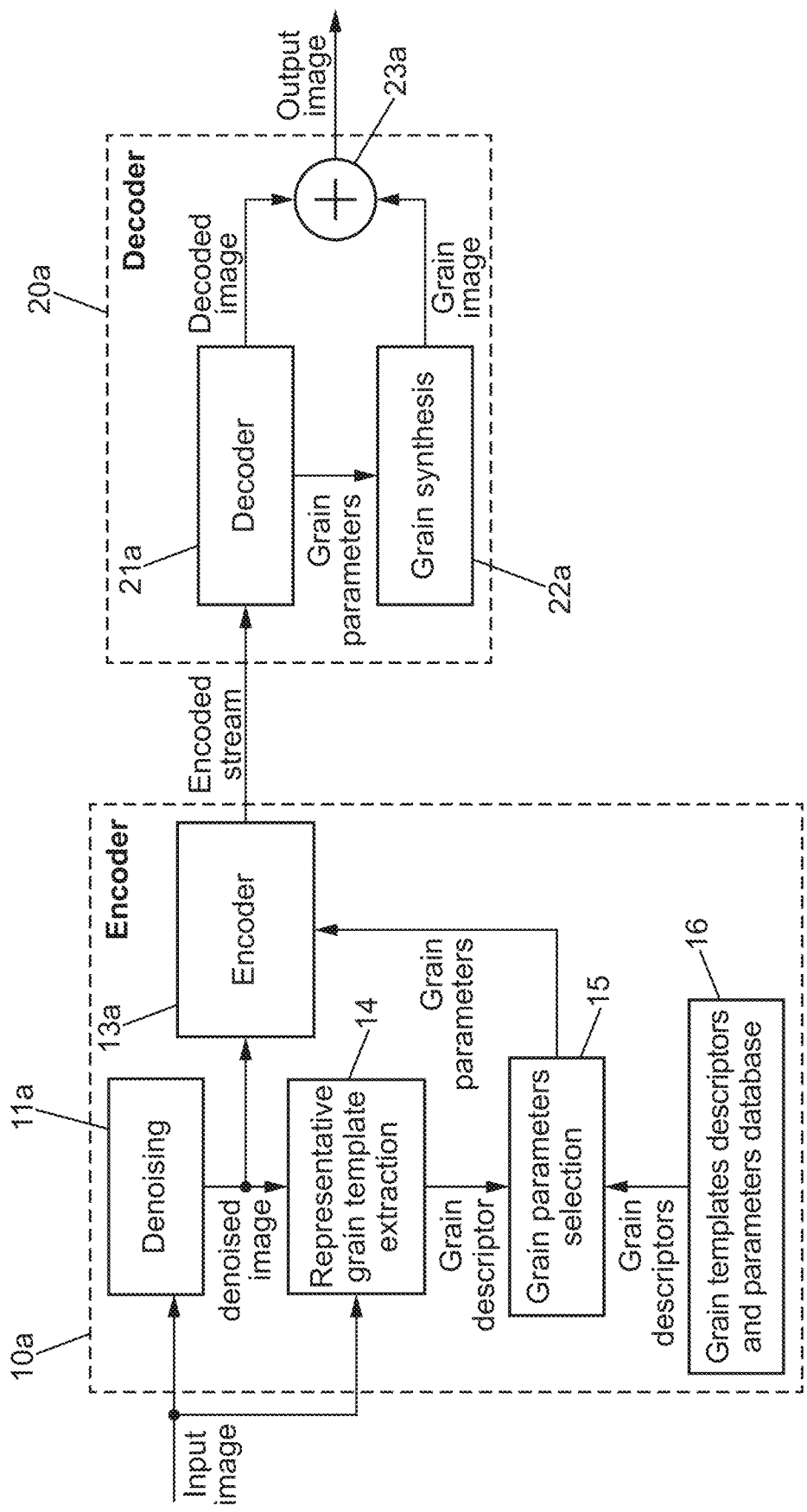
FIG. 7a is a block diagram illustrating an exemplary encoder in which the proposed image processing methods may be implemented in accordance with one or more embodiments.

FIG. 7a shows an exemplary encoder 10a configured for implementing embodiments of the proposed image processing method according to the present subject disclosure.

As shown in FIG. 7a, the improved encoder 10a may comprise engines or functions that are similar to those comprised in the encoder 10 illustrated on FIG. 1: the encoder 10a may comprise a denoising engine 11a and an encoder engine 13a which provide functions similar to those of the corresponding engines illustrated on FIG. 1. In contrast to the encoder 10 of FIG. 1, the improved encoder 10a may not include a grain parameters computation engine. Instead, the encoder 10a may comprise a representative grain template extraction engine 14, a grain parameter selection engine 15, and a grain template descriptors and parameters database 16. The representative grain template extraction engine 14 may be configured to extract one or more grain patches and/or grain templates from the input image, compute grain descriptor data (e.g. autocovariance values) based on the extracted templates, and to output the grain descriptor data to the grain parameters selection engine 14. The grain template descriptors and parameters database 16 may be a database configured with entries comprising respective grain template or template descriptor data (e.g. autocovariance values) representing descriptors of grain templates and corresponding grain parameters (corresponding to the grain templates) based on a grain parametric model. The grain parameters selection engine 15 may be configured to select in the database 16 grain parameters through selection of an entry of the database 16, based on a comparison of grain descriptors of entries of the database 16 with grain descriptors received from the representative grain template extraction engine 14. The grain parameters selection engine 15 may then provide the selected grain parameters data to the encoder 13a so that it may be included in the encoded stream output by the improved encoder 10a, possibly after further processing.

FIG. 7a also shows an exemplary decoder 20a, which may comprise engines or functions that are similar to those comprised in the decoder 20 illustrated on FIG. 1: the decoder 20a may comprise a decoder engine 21a, a grain synthesis engine 22a, and a combiner engine 23a which provide functions similar to those of the corresponding engines illustrated on FIG. 1.

In embodiments in which the noise model used for modelling the grain is an AR parametric model, the grain parameters data may include data corresponding to linear combination parameters ($\varphi_1, \varphi_2, \ldots, \varphi_P$), noise variance (or, depending on the embodiment, standard deviation) parameter ($\sigma$), and seed parameter of the AR model.

Advantageously, grain parameters may be provided to the encoder 13a, as described in relation to FIG. 1, however without the need to compute such grain parameters or to generate corresponding grain templates, thereby avoiding the drawbacks associated therewith.

Figure 7B:
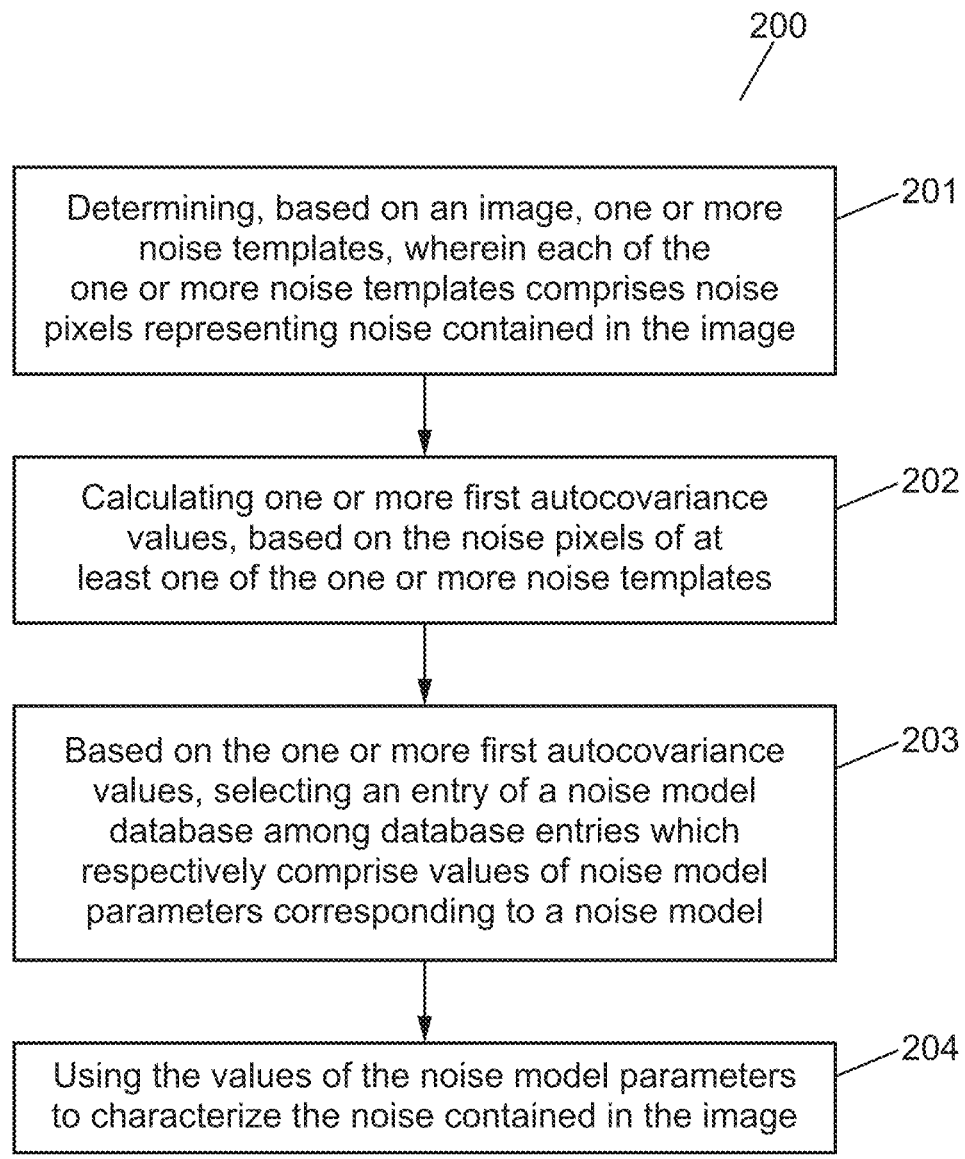
FIG. 7b illustrates an exemplary image processing method according to one or more embodiments of the present subject disclosure.

FIG. 7b illustrates an exemplary image processing method 200 according to one or more embodiments of the present subject disclosure.

An image which is to be processed for noise analysis (e.g. grain analysis), for example for purposes of image encoding, is considered as input of the proposed process, and may be indifferently referred to in the following as the "original" image or the "input" image.

As shown on FIG. 7b, in some embodiments, one or more noise templates, each comprising noise pixels representing noise contained in the input image (e.g. analyzed) 201 may be determined. In the following, a noise template corresponding to the input image may sometimes be referred to as "original noise template", or an "input noise template".

In one or more embodiments, a noise template may be a set of noise pixels, for example a block of pixels, with each noise pixel of the noise template representing noise (e.g. grain) in the input image. For example, given a pixel of the input image, a corresponding noise pixel that may be a pixel of a noise template may represent noise data (e.g. grain data) contained in the pixel.

As mentioned above, it may be advantageous to use noise templates of a smaller pixel size than the pixel size of the input image in order to reduce the processing time and/or computation complexity. Depending on the embodiment, the size of a noise template may be chosen to correspond to that of a noise template (64×64 pixels) or of a noise patch (32×32 pixels) as specified in the AV1 specifications.

In addition, it may also be desirable to determine several noise templates in order to perform the proposed method on a plurality of noise templates and obtain more image processing result data, or in order to perform the proposed method on a noise template determined based on the several noise templates initially determined, for example by combining them.

For example, in some embodiments, it may be advantageous to determine based on the input image two noise templates that respectively correspond to blocks of the input image that are not adjacent, and each provide a complementary representation of noise in the input image. The grain for example may have a certain texture in one part of the input image, and a different texture in a different part of the input image. In such a situation, it may be desirable to determine two noise templates, each representing respective grain textures present in the input image.

In some embodiments, as discussed above, one or more noise templates may be determined for one or more, possibly each of image planes such as (Y, Cb, Cr) planes. For example, one or more noise templates may be determined for the Y plane, so that noise contained in the image may be represented for different luminance levels. Likewise, depending on the embodiment, one or more noise templates may be determined for the Cb plane and/or for the Cr plane. The subsequent operations of the proposed processing method may then be performed for the various noise templates (possibly respectively) corresponding to Y, Cb, and/or Cr planes.

The subsequent operations of the proposed processing method are described in further details below.

As part of these subsequent operations, one or more autocovariance values, referred to in the present subject disclosure as "noise template autocovariance values", may be calculated 202 on the pixels of at least one of the determined one or more noise templates.

For example, given a noise template determined based on an input image, and comprising (noise) pixels that represent noise contained in the input image, one or more autocovariance values may be calculated based on the (noise) pixels of the noise template.

The autocovariance value(s) calculated based on a noise template may form a set of noise template autocovariance values.

An entry of a noise model database (e.g. an AR noise model database) may then be selected 203 based on the calculated autocovariance value(s).

The database may be preconfigured with several entries, each of which may comprise data representing a noise template (referred to in the following as a "database noise template"), so that the selection of an entry of the database may correspond to selecting a database noise template corresponding to the selected entry.

In one or more embodiments, entries of the database may respectively comprise values of noise model parameters (e.g. values of auto-regressive (AR) parametric noise model parameters) corresponding to a noise model (e.g. an AR parametric model), in particular in that the parameters may be usable for generating a noise template according to the synthesis part of the noise model.

For example, in some embodiments, the database may contain several entries, each comprising a set of noise model parameters representing a database noise template of noise pixels (which may be referred to in the present subject disclosure as "noise model noise pixels" or as "pseudo-pixels"). Indeed, each noise model noise pixel of the database noise template may be computed based on the parameters of the noise model.

In particular, in embodiments where an AR parametric model is used, each AR parametric noise model noise pixel of the database noise template may be computed based on the parameters of the AR parametric noise model, for example typically based on a combination of a linear combination of P previous noise pixels in a causal neighborhood of the AR parametric noise model noise pixel weighted by respective AR model linear combination parameters $(\varphi_1, \ldots, \varphi_P)$ with a generated noise sample corresponding to an additive Gaussian noise of AR model variance parameter (a) and using a seed parameter of a pseudo-random number generator.

The noise model parameters (e.g. AR parametric noise model parameters) comprised in the selected entry of the database may therefore allow computing noise pixels of a corresponding database noise template. As a consequence, selecting the entry in the database may result in indirectly selecting a corresponding database noise template.

In one or more embodiments, the values of the noise model parameters obtained through selection of an entry of the database may be used 204 to characterize the noise contained in the input image, possibly for the purposes of analyzing such noise, or for the purposes of further processing of the input image, such as encoding.

In some embodiments, the database noise template and/or the noise model parameters thus obtained may be used as output data of the proposed processing scheme, for example in the cases where the purpose of such processing is to analyze the noise contained in the input image. In such cases, the obtained database noise template and/or the noise model parameters may constitute the result of such noise analysis.

In embodiments where the purpose of the proposed processing scheme is to encode the input image data, the obtained noise template may be advantageously used to generate a denoised image provided as input data to the encoder as discussed above, and noise model parameters corresponding to the parameters of the selected database entry may be provided in the encoded stream as part of output encoded data to be provided to a decoder.

Therefore, in one or more embodiments in which the proposed method is performed at an encoder configured for encoding the input image, the method may further comprise the generating of a set of denoised image pixels, based on the AR parametric noise model parameters comprised in the entry selected in the AR parametric noise model database.

Examples of autocovariance value calculation for an input image are provided in the following:

In one or more embodiments, given a noise template, and given a current noise pixel of the noise template, the number N of autocovariance values calculated based on pixels of the noise template may be chosen based on a lag parameter L' (referred to as an "autocovariance lag parameter") which determines a size of a neighborhood of the current pixel.

In embodiments in which an AR parametric noise model is used, the autocovariance lag parameter L' may advantageously be chosen based on the lag parameter L used for the AR parametric noise model. As discussed above, the lag parameter L used for the AR parametric noise model may be chosen equal to 2 or 3, and the autocovariance lag parameter L' may also typically be chosen equal to 2 or 3.

FIG. 8 illustrates a set of pixels based on which autocovariance values may be calculated according to one or more embodiments.

As illustrated on FIG. 8, autocovariance values may be calculated on noise pixels of a noise template (which may be an original noise template or a database noise template), based on a current noise pixel represented by a random variable $X_{i,j}$ and noise pixels in the neighborhood of the current noise pixel. For example, the values of random variables of noise pixels $X_{i+1,j}$, $X_{i+2,j}$, $X_{i+3,j}$, $X_{i+1,j+1}$, $X_{i+2,j+1}$, $X_{i+3,j+1}$, $X_{i+2,j+2}$, $X_{i+3,j+2}$, and $X_{i+3,j+3}$ located in the neighborhood of the current noise pixel $X_{i,j}$, may be used for determining nine autocovariance values (estimates $(\gamma_m)_{m=1, \ldots, 9}$) as follows:

$\gamma_1 = \mathbb{E}(X_{i,j} \cdot X_{i+1,j})$ $\gamma_2 = \mathbb{E}(X_{i,j} \cdot X_{i+2,j})$ $\gamma_3 = \mathbb{E}(X_{i,j} \cdot X_{i+3,j})$ $\gamma_4 = \mathbb{E}(X_{i,j} \cdot X_{i+1,j+1})$ $\gamma_5 = \mathbb{E}(X_{i,j} \cdot X_{i+2,j+1})$ $\gamma_6 = \mathbb{E}(X_{i,j} \cdot X_{i+3,j+1})$ $\gamma_7 = \mathbb{E}(X_{i,j} \cdot X_{i+2,j+2})$ $\gamma_8 = \mathbb{E}(X_{i,j} \cdot X_{i+3,j+2})$ $\gamma_9 = \mathbb{E}(X_{i,j} \cdot X_{i+3,j+3})$ where $\mathbb{E}(X. Y)$ denotes the mathematical expectancy of the product of random variables X and Y representing pixels, which may be calculated according to any suitable known method.

For example, in some embodiments, the mathematical expectancy of the product of random variables representing pixels of coordinates (i,j) and (i+k,j+l) separated by a vector (k,l) in the array of noise pixels constituting the noise template may be estimated by computing an average value of the multiplication of the two pixels, and a set of autocovariance values $(\gamma_{k,l})_{k,l \in E}$ (where E is a set of (k,l) pair values) may be calculated on this basis.

In one or more embodiments, a database of noise templates is used to estimate the parameters according to a noise model.

For example, in some embodiments, a database of noise templates of AR parametric noise model noise pixels may be used to estimate the AR parametric noise model parameters suitable for characterizing noise contained in an input image.

In some embodiments, the database may comprise values of noise model parameters (e.g. AR parametric noise model parameters). The database may have entries which respectively comprise values of noise model parameters, wherein a set of values of noise model parameters comprised in an entry corresponds to a noise template of noise pixels which are computable using the parameters.

In some embodiments, each of the database entry may comprise values of noise model parameters associated with one or more of luminance and chrominance planes (e.g. Y, Cb, Cr planes), so as to advantageously perform the database search according to embodiments of the proposed method on separate luminance and/or chrominance planes.

In one or more embodiments where an AR parametric model is used, the database may be composed of entries, each of which comprising the following:

(1) AR model linear combination coefficients $(\varphi_1, \ldots, \varphi_P)$, possibly for one or more of luminance and chrominance planes (e.g. Y, Cb, Cr planes), with associated parameters, such as, for example, the ar_coeff_shift and/or ar_coeff_lag parameters specified in the AV1 specifications;

(2) One or more seeds suitable for use with a pseudo-random number generator for generating a noise sample to be combined with a linear combination of previous noise pixels in a causal neighborhood of a current noise pixel (of a noise template) weighted by the AR model linear combination coefficients. Preferably, the seeds recorded in a database entry would be chosen for their ability to avoid creating unpleasant noise patterns in cases where the noise template is to be used for noise synthesis to be applied to a denoised image;

(3) One or more AR model variance parameter ($\sigma$) values (possibly respectively corresponding to Y, Cb, and/or Cr planes) for generating respective noise templates and corresponding to the variance of an AR model additive Gaussian noise. In some embodiments these values may take the form of floating numbers each representing the value of an AR model variance parameter ($\sigma$) (3 floating numbers may therefore be used for recording in the database entry the value of sigma for an AR scheme for each of Y, Cb, Cr planes) according to an AR model for generating a noise template (e.g. a grain template) of unitary standard deviation. In practice, these values might be close to 1, however may not necessarily be equal to 1. In some embodiments, the value of the AR model variance parameter ($\sigma_{database}$) stored in a database entry may be pre-calculated based on other AR noise model parameters (e.g. linear combination parameters and seed parameter). Indeed, the AR noise model parameters that may most have an impact on potential visual artefacts are the linear combination $(\varphi_1, \ldots, \varphi_P)$ and seed parameters. In contrast, the AR model variance parameter ($\sigma$) mostly influences the magnitude of the noise (and therefore of the visual artefacts). As a consequence, in some embodiments, it can be advantageously ensured that the database entries store respective linear combination $(\varphi_1, \ldots, \varphi_P)$ and seed parameters which do not create visual artefacts, and to control the corresponding noise magnitude by generating, for example upon selecting a database entry, for these linear combination $(\varphi_1, \ldots, \varphi_P)$ and seed parameters a value of the AR model variance parameter (a). In some embodiments, instead of storing in at least some of the database entries a plurality of AR model variance parameter (a) values for the same values of the linear combination $(\varphi_1, \ldots, \varphi_P)$ and seed parameters, a normalized value is calculated for the AR model variance parameter ($\sigma$) that correspond to values of the linear combination $(\varphi_1, \ldots, \varphi_P)$ and seed parameters stored in the entry, so as to advantageously reduce the number of AR model variance parameter ($\sigma$) values stored in each entry of the database. In some embodiments, a single value of the AR model variance parameter ($\sigma_{database}$) may be stored in each database entry. In such embodiments, upon selecting an entry of the database, that is, upon selecting a set of linear combination $(\varphi_1, \ldots, \varphi_P)$ and seed parameters stored in an entry of the database which characterize the visual shape of the noise (e.g. the grain), the corresponding AR model variance parameter ($\sigma_{database}$) value may be scaled so as to represent a desired noise (e.g. grain) amplitude. For example, in some embodiments, the corresponding AR model variance parameter ($\sigma_{database}$) value may be multiplied by an estimated standard deviation of the database noise template corresponding to the linear combination ($\varphi_1, \ldots, \varphi_P$) and seed parameters values stored in the selected entry of the database. In embodiments, the value of the AR model variance parameter ($\sigma$) used as output of the database entry selection process may be computed by the following formula:

$$\sigma = \sigma_{database} \times \text{std\_dev}(\text{rep\_db\_noise\_temp}),$$

where $\sigma_{database}$ is the AR model variance parameter value stored in the selected database entry, and std_dev(rep_db_noise_temp) is a standard deviation calculated for the database noise template corresponding to the selected database entry (rep_db_noise_temp).

In some embodiments, multiple AR model variance parameter ($\sigma$) values may be computed for each plane among luminance or chrominance planes (such as Y, Cb, Cr planes).

In one or more embodiments, the one or more computed AR model variance parameter ($\sigma$) values may be provided in the encoder output, for example as formatted with a piecewise linear function, such as specified by AV1 (point_plane_value[i]+grain_scaling) using the formula: $\sigma = 2^9 / 2^{(12-bitDepth+grain\_scale\_shift)} \times \text{pointgplane\_value}[i]$ $2^{grain\_scaling}$. In the above formula, u is a parameter that characterizes the noise (e.g. grain) intensity, grain_scale_shift is a parameter defined in the AV1 specifications, taking integer values between 0 and 3, used for managing the $\sigma$ parameter for grain templates for Y, Cb, and Cr planes. The higher grain_scale_shift, the weaker the template grain variance. point_plane_value[i] is also a parameter defined in the AV1 specifications, taking integer values between 0 and 255, and configured in a look-up table. A point_plane_value [i] value is associated with each pixel of the denoised image. The point_plane_value [i] parameter allows, in association with the grain_scaling parameter (which takes integer values between 8 and 11), adapting the grain intensity to values of pixels of the denoised image. The parameter value of grain_scale_shift may typically be chosen equal to 0.

In one or more embodiments, a plurality of seed values may be stored in each entry of the noise model database (e.g. 20 seed values), and one of the seed values stored in the selected database entry may be selected, for example randomly, as output data of the proposed method. In some embodiments wherein the proposed method is used at a video encoder for purposes of encoding frames of an input video, better grain synthesis quality results may be obtained by configuring the encoder for avoiding that the same seed value is selected for two consecutive frames.

Therefore, in one or more embodiments, each entry of the database may comprise data representing values of noise model parameters (e.g. AR parametric noise model parameters typically comprising linear combination parameters and associated parameters, Gaussian noise variance parameters, and pseudo-random number generator seed parameter(s)). These noise model parameters may correspond to one or more database noise templates which may be generated based on the noise model parameters. The noise model parameters data comprised in a database entry therefore may represent one or more noise templates, so that selection of a database entry amounts to selecting the one or more corresponding database noise templates. The pixels of a database noise template may be referred to as "pseudo-pixels" as they correspond to pixels of a virtual noise template (which may not in itself be stored in the database but instead characterized by corresponding pre-computed noise model parameters stored in the database), which itself corresponds to noise model parameter data stored in the database entry.

In some embodiments, one or more of the database noise templates based on which second autocovariance values may be calculated, may correspond to normalized noise templates, for example by dividing their noise pixels by a standard deviation calculated based on the noise template being processed.

In one or more embodiments, each entry of the database may also comprise data representing autocovariance values (each of which may sometimes be referred to in the present subject disclosure as a "database autocovariance value" or a "second autocovariance value") already computed (pre-calculated) for the one or more corresponding database noise templates (possibly respectively corresponding to Y, Cb, and/or Cr planes).

For example, taking into account symmetry, only nine database autocovariance values ($\gamma_{k,l,d} = \mathbb{E}(X_{i,j}^d \cdot X_{i+k,j+l}^d)$ where $\mathbb{E}$ is the mathematical expectancy, and $X_{i,j}^d$ is a pseudo-pixel of the database noise template located at (i,j), and with $(k,l) \in E = \{(1,0); (2,0); (3,0); (1,1); (2,1); (3,1); (2,2); (3,2); (3,3)\}$ as illustrated on FIG. 8) for a plane (among Y, Cb, and/or Cr planes) may be stored in some embodiments in the database entry.

In one or more embodiments, the second autocovariance values may then be pre-calculated, and comprised in data stored in respective database entries.

In other embodiments, the second autocovariance values may be obtained, for example calculated, for each entry of the database to be searched, based on noise pixels representing one or more database noise templates corresponding to the values of noise model parameters comprised in the entry.

Therefore, depending on the embodiment, the second autocovariance values may be calculated upon searching the database for selection of an entry, or may have been pre-calculated and stored in corresponding entries of the database. The pre-calculation of autocovariance values advantageously avoids calculating these values when searching the database, thus leading to a reduced processing complexity and time, whereas the calculating the autocovariance values on the fly provides an advantageously flexible solution according to which the scheme for calculating the autocovariance values can evolve over time and be used only when searching the database (instead of when building the database).

In some embodiments, the mathematical expectancy may be estimated using an average value of the multiplication of two (noise) pixels of the corresponding noise template. For example, the autocovariance value for (k,l) indices ($\gamma_{k,l}$) may be computed based on an average value of the multiplication of two pseudo-pixels of the corresponding database noise template separated by a vector (k,l) ($X_{i,j}^d$ and $X_{i+k,j+l}^d$).

In one or more embodiments, possibly for each plane among Y, Cb, and/or Cr planes for which noise model parameter data corresponding to one or more database noise templates are stored in a database entry, a set of second autocovariance values may be pre-calculated, possibly subsequently to a normalization of the database noise template(s) by standard deviation. For example, as discussed above, for each of the Y, Cb, Cr planes, nine second autocovariances values ($\gamma_{m,d})_{k=1,\ldots,9}$ (where m is the autocovariance value index for a given plane, and d indicates that the autocovariance value corresponds to a database noise template) may be computed based on the noise pixels of the corresponding noise template, possibly after normalization thereof, which would lead to 27 second autocovariance values (noted $(\gamma_{m,p,d})_{m=1, \ldots, 9; p=Y,Cb,Cr}$, where m is the autocovariance value index for a given plane, p is a plane index indicating a luminance or chrominance plane among Y, Cb, and Cr, and d indicates that the autocovariance value corresponds to a database noise template, or as used below $(\gamma_{k,l,p,d})_{(k,l) \in E; p=Y,Cb,Cr}$, where the pair of indices (k,l) indicates the shifts along respective dimensions of a coordinate system with respect to the location of a current noise pixel, p is a plane index indicating a luminance or chrominance plane among Y, Cb, and Cr, E is a set of shift indices, and d indicates that the autocovariance value corresponds to a database noise template).

Therefore, in some embodiments, a database entry may therefore comprise data representing values of noise model parameters (e.g. AR parametric noise model parameters) suitable for generating at least 3 database noise templates, each corresponding to a respective plane among Y, Cb, and Cr planes, and corresponding pre-computed autocovariance values $(\gamma_{m,p,d})$.

Precomputing autocovariance values for database noise templates corresponding to data stored in the database entries advantageously allows efficiently searching the database entries based on these autocovariance values, as described below in some embodiments. The pre-computed database autocovariance values may indeed allow a fast search and selection of an entry of the database based on a selection criterion which uses these database autocovariance values, as such selection criterion may be used without the need for calculating during a database search database autocovariance values for each database entry included in the database search.

In one or more embodiments, the database may be built based on noise samples extracted from reference images (preferably chosen because they contain cinema grain or movie grain for example and therefore have a "Hollywood feel"), or noise template databases.

In one or more embodiments, one or more (each of which may sometimes be referred to in the present subject disclosure as an "original noise template") noise templates (for example of size 64×64 pixels or 32×32 pixels for a grain patch as specified in the AV1 specifications) may be extracted from an input image to be processed according to the present subject disclosure by selecting blocks of the input image with lowest variances or, depending on the embodiment, blocks with variances below a predetermined threshold.

Therefore, in some embodiments, one or more noise templates may be determined based on the input image, with each of the one or more noise templates comprising noise pixels representing noise contained in the input image.

In embodiments wherein the proposed method is performed at an encoder configured for encoding the input image, for example according to the AV1 specifications, the original noise templates may be of a predetermined size (e.g. pixel size) smaller than the size (e.g. pixel size) of the input image, which predetermined size may be chosen corresponding to the size of a noise synthesis template used at a decoder to synthesis noise based on the noise model, so as to lower the computation complexity of the encoding process.

Depending on the embodiment, an original noise template may be extracted directly from the input image or be extracted from a set of pixels representing a difference between the input image and a denoised image.

In one or more embodiments, one or more original noise templates may be determined for each plane among Y, Cb, and/or Cr planes of pixels of the input image.

Advantageously, in some embodiments, original noise templates (e.g. grain patches) may be extracted from the input image for different values of original luminance, so as to limit the effects of a bad denoising. Indeed, features of the noise contained in the input image may vary according to the level of luminance. Depending on the embodiment, the proposed processing of the input image may be performed for each of a set of luminance bands (for example each defined by an upper band value and a lower band value) so as to obtain noise model parameters through the proposed method respectively associated with luminance bands, or may be performed for several luminance bands so as to obtain noise model parameters that characterize an average of the noise on the whole input image.

The determination of one or more noise templates based on the input image advantageously allows calculating autocovariance values based on the noise template(s) corresponding to the input image (so-called "first autocovariance values"), which may be used for selecting an entry in the noise model database that correspond to the noise contained in the input image.

In one or more embodiments, for each plane among Y, Cb, and/or Cr planes for which one or more original noise templates are determined, a set of (first) autocovariance values may be computed, possibly subsequently to a normalization of the original noise template(s) based on standard deviation. For example, as discussed above, for each of the Y, Cb, Cr planes, nine autocovariances values $(\gamma_{m,o})_{k=1, \ldots, 9}$ (where m is the autocovariance value index for a given plane, and o indicates that the autocovariance value corresponds to an original noise template) may be computed based on the noise pixels of the corresponding noise template, possibly after normalization thereof, which would lead to characterizing the noise contained in the input image with a set of 27 autocovariance values (noted $(\gamma_{m,p,o})_{m=1, \ldots, 9; p=Y,Cb,Cr}$, where m is the autocovariance value index for a given plane, p is a plane index indicating a luminance or chrominance plane among Y, Cb, and Cr, and o indicates that the autocovariance value corresponds to an original noise template, or as used below $(\gamma_{k,l,p,o})_{(k,l) \in E; p=Y,Cb,Cr}$, where the pair of indices (k,l) indicates the shifts along respective dimensions of a coordinate system with respect to the location of a current noise pixel, p is a plane index indicating a luminance or chrominance plane among Y, Cb, and Cr, E is a set of shift indices (preferably identical to the set of shift indices used for calculating the database autocovariance values $(\gamma_{k,l,p,d})_{(k,l) \in E; p=Y,Cb,Cr}$), and o indicates that the autocovariance value corresponds to a database noise template).

In some embodiments, prior to calculating the first autocovariance values, one or more of the original noise templates based on which first autocovariance values are calculated may be normalized, for example by dividing their noise pixels by a standard deviation calculated based on the original noise template being processed.

As discussed above, in some embodiments, a database may be provided with entries comprising data representing one or more sets of values of noise model parameters (e.g. AR parametric noise model parameters, which may typically comprise linear combination parameters, a variance parameter, and a seed parameter) (which may also be referred to in the present subject disclosure as "coefficients"), each set possibly corresponding to a luminance or chrominance plane, e.g. among Y, Cb, and/or Cr planes.

In one or more embodiments, given an input image to be processed, a database search may be performed to select a database entry based on the input image, thereby selecting data (stored in the selected entry) representing one or more sets of values of noise model parameters (e.g. AR parametric noise model parameters) comprised therein.

The selected one or more sets of values of noise model parameters may be used as output data of the proposed processing scheme applied to the input image. In cases where such processing scheme is directed to analyzing noise contained in the input image, the data representing one or more sets of values of noise model parameters may be considered as characterizing the noise contained in the input image according to a noise model (e.g. an AR parametric noise model). In cases where such processing scheme is further directed to analyzing noise contained in the input image for encoding the input image, the data representing one or more sets of values of noise model parameters may be included, possibly after further processing or formatting) in output data of an encoder as part of data output by the encoder from the encoding of the input image.

In some embodiments, the selection of a database entry based on the input image may use a selection criterion based on one or more (first) autocovariance values corresponding to noise contained in the input image on the one hand, and to the one or more noise templates characterized by the one or more sets of values of noise model parameters of the database entry on the other hand.

The first autocovariance values calculated based on the input image may therefore advantageously used for the database search as part of using the selection criterion.

In one or more embodiments, the selection criterion may use a similarity estimate representing a similarity between first autocovariance values computed on an original noise template (that is, a noise template determined based on the input image and representing noise contained in the input image), and second autocovariance values computed on database noise templates (that is, noise templates that can be generated based on noise model parameters values comprised in the database entries). Indeed, in some embodiments, each entry of the database to be searched for purposes of selecting one of them may comprise one or more second autocovariance values calculated based on pseudo-pixels corresponding to one or more database noise templates that may be synthesized based on the noise model parameters comprised in the entry. Alternatively, the second autocovariance values may be calculated based on the data comprised in the entry as part of performing the database search.

As discussed above, in one or more embodiments, a database entry may therefore comprise data representing values of noise model parameters (e.g. AR parametric noise model parameters) suitable for generating one or more database noise templates, and corresponding pre-computed (second) autocovariance values $((\gamma_{m,d})$ or, depending on the embodiment, $(\gamma_{k,l,p,d})_{(k,l) \in E; p=Y,Cb,Cr})$. Further, (first) autocovariance values $((\gamma_{m,o})$ or, depending on the embodiment, $(\gamma_{k,l,o})_{(k,l) \in E; p=Y,Cb,Cr})$ may have been computed for noise pixels of original noise template(s) corresponding to the input image.

In one or more embodiments, the selecting the entry of the noise model database may be based on a comparison of the one or more first autocovariance values with the one or more second autocovariance values.

In one or more embodiments, a selection criterion may be used on a searched database entry by estimating a similarity between (second) autocovariance values $(\gamma_{m,d})$ corresponding to data of the database entry (in some embodiments pre-computed and stored as data of the database entry) and (first) autocovariance values $(\gamma_{m,o})$ corresponding to noise pixels of original noise template(s) corresponding to the input image.

In some embodiments, a database entry may be selected based on its corresponding to autocovariance values $(\gamma_{m,d})$ being the most similar to autocovariance values $(\gamma_{m,o})$ corresponding to noise pixels of an original noise template corresponding to the input image. For example, noise (e.g. grain) model parameters (e.g. grain AR model parameters) may be selected through selecting an entry among the database entries with pre-computed and stored autocovariance values $(\gamma_{m,d})$ being the most similar to autocovariance values $(\gamma_{m,o})$ calculated based on an original noise template determined based on the input image.

In one or more embodiments, the similarity between sets of first and second autocovariance values may be estimated or calculated by estimating a distance between the autocovariance values. The one or more first autocovariance values may then be compared with the one or more second autocovariance values based on a distance between these autocovariance values. In some embodiments, the database entry which contains data for which a distance between autocovariance values calculated based on the input image and autocovariance values calculated based on a noise template represented by data stored in the database entry is minimum among the distances respectively estimated for other searched database entries may be selected.

A person of ordinary skill in the art would understand that any suitable norm or distance function, such as the Euclidian distance, may be used for purposes of estimating the similarity between two sets of autocovariance values, and that the Euclidian distance is given as an example only.

In one or more embodiments, the distance between first autocovariances $(\gamma_{m,o})$ and database autocovariances $(\gamma_{m,d})$ may be calculated according to the following formula:

$$\sum_{m} (\gamma_{m,o} - \gamma_{m,d})^2$$

In embodiments where autocovariances are calculated for each of the (Y,U,V) planes, the distance between first autocovariances $(\gamma_{k,l,o,p})$ and database autocovariances $(\gamma_{k,l,d,p})$ may be calculated according to the following formula:

$$\sum_{(k,l) \in E, p \in \{Y,Cb,Cr\}} c_p (\gamma_{k,l,o,p} - \gamma_{k,l,d,p})^2$$

where $c_p$ is weight parameter used to apply plane-dependent ($p \in \{Y,Cb,Cr\}$) weighting coefficients.

In some embodiments, the weight parameter $c_p$ may be set to 1 for all planes p.

In other embodiments, a higher weight may be set on the Y plane, as compared to the weight coefficients used for the U and V planes (also referred to as Cb and Cr planes). For example, the weight coefficients may be set as follows: $c_U = c_V = 1$, and $c_Y = 4$.

Figure 9:
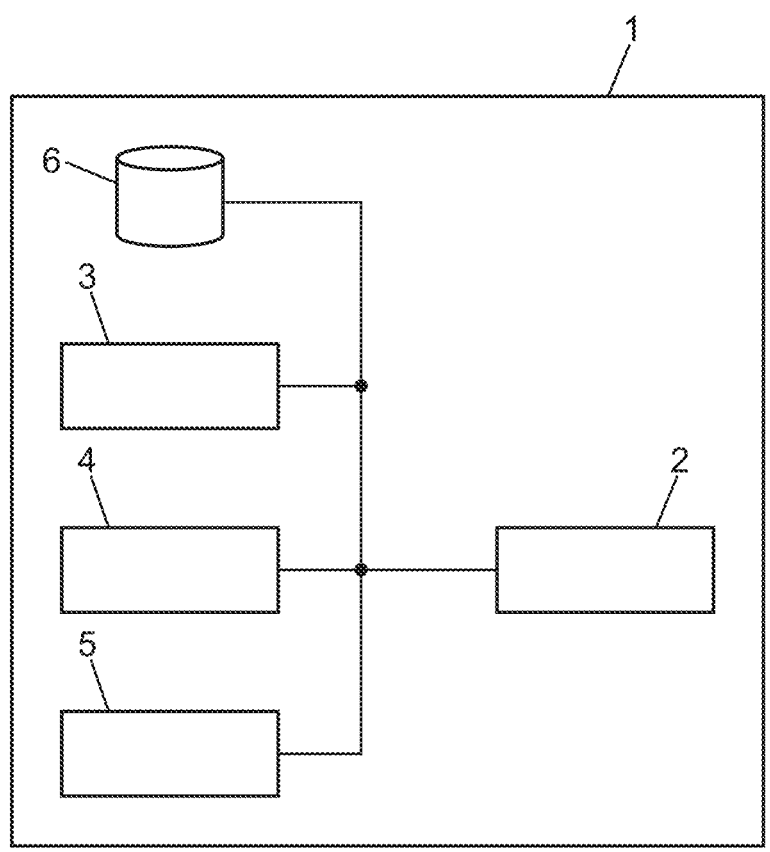
FIG. 9 illustrates an exemplary apparatus or unit configured to use one or more image processing features in accordance with one or more embodiments of the present subject disclosure.

An exemplary architecture of an apparatus, such as a processing node or a video encoder, according to the present subject disclosure is illustrated on FIG. 9 which shows an apparatus 1 configured to perform a method for processing an image in accordance with embodiments of the present subject disclosure.

The apparatus 1, which may comprise one or more computers, includes a control engine 2, an image processing engine 3, a data interface engine 4, a memory 5, and a noise parameters database 6.

In the architecture illustrated on FIG. 9, all of the image processing engine 3, data interface engine 4, noise parameters database 6 and memory 5 are operatively coupled with one another through the control engine 2.

In some embodiments, the image processing engine 3 is configured to perform various aspects of embodiments of one or more of the proposed methods for image processing as described herein, such as determining noise templates based on the input image and calculating first autocovariance values based on the determined noise templates, and selecting an entry of the noise parameters database 6 based on the first autocovariance values. In embodiments, the image processing engine 3 may be configured to include a representative grain patch extraction engine 14 and a grain parameters selection engine 15, such as illustrated on FIG. 7a.

In some embodiments, the data interface engine 4 is configured to receive an input image, possibly as part of an input video data, and to output noise model parameters. In some embodiments, the data interface engine 4 is capable of searching the noise parameters database under the control of the image processing engine 3.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage or computer storage medium, coupled to the control engine 2 and operable with the data interface engine 4 and the image processing engine 3 to facilitate management of data stored in association therewith, such as, for example, a cache memory, a data farm, a data warehouse, a data mart, a datacenter, a data cloud, or a combination thereof.

In embodiments of the present subject disclosure, the apparatus 1 is configured for performing one or more of the image processing methods described herein. The apparatus 1 may in some embodiments be included in an image encoder or, depending on the embodiments, in a video encoder or a video codec.

In some embodiments, the noise parameters database 6 is configured as a database with entries respectively comprising values of noise model parameters corresponding to a noise model. Depending on the embodiment, the noise parameters database 6 may be implemented in a standalone server configured for storing a database according to the present subject disclosure, and for receiving database search requests according to a predefined format and/or a predefined data communication protocol.

It will be appreciated that the apparatus 1 shown and described with reference to FIG. 9 is provided by way of example only. Numerous other architectures, operating environments, and configurations are possible. Other embodiments of the node may include fewer or greater number of components, and may incorporate some or all of the functionality described with respect to the apparatus components shown in FIG. 9. Accordingly, although the control engine 2, image processing engine 3, data interface engine 4, noise parameters database 6, and memory 5 are illustrated as part of the apparatus 1, no restrictions are placed on the location and control of components 2-6. In particular, in other embodiments, any of components 2-6 may be part of different entities or computing systems.

The proposed method may be used for the processing, for purposes of encoding or compression, or decoding or decompression, of input data which may correspond, depending on the embodiment, to an image, a picture, a video frame, or video data.

While the invention has been described with respect to preferred embodiments, those skilled in the art will readily appreciate that various changes and/or modifications can be made to the invention without departing from the spirit or scope of the invention as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method of processing an image, the method comprising:
    determining, based on the image, one or more noise templates, each of the one or more noise templates including noise pixels representing noise contained in the image;
    calculating one or more first autocovariance values, based on the noise pixels of at least one of the one or more noise templates;
    based on the one or more first autocovariance values, selecting an entry of a noise model database among database entries which respectively comprise values of noise model parameters corresponding to a noise model;
    using the values of the noise model parameters to characterize the noise contained in the image to be used for further processing of the image; and obtaining, for each entry of the database to be searched, one or more second autocovariance values, based on noise pixels representing one or more database noise templates corresponding to the values of noise model parameters comprised in the entry, wherein the one or more second autocovariance values are pre-calculated, and comprised in data stored in the entry.

2. The method according to claim 1, wherein the selecting the entry of the noise model database is based on a comparison of the one or more first autocovariance values with the one or more second autocovariance values.

3. The method according to claim 2, further comprising: comparing the one or more first autocovariance values with the one or more second autocovariance values based on a distance between the one or more first autocovariance values and the one or more second autocovariance values.

4. The method according to claim 1, performed at an encoder configured for encoding the image, the method further comprising: generating a set of denoised image pixels, based on the noise model parameters comprised in the entry selected in the noise model database.

5. The method according to claim 1, wherein the one or more noise templates are determined for pixels of the image corresponding to respective values of planes (Y, Cb, Cr), each representing luminance or chrominance of pixels.

6. The method according to claim 1, further comprising: normalizing one or more of the noise templates based on which first autocovariance values are calculated, prior to calculating the first autocovariance values, by dividing their noise pixels by a standard deviation calculated on their basis.

7. The method according to claim 1, wherein each of the database entries comprises values of noise model parameters associated with one or more of (Y, Cb, Cr) planes representing luminance or chrominance of pixels.

8. The method according to claim 1, wherein the noise model is an auto-regressive ("AR") parametric noise model, and the noise model parameters comprise AR parametric noise model parameters, wherein each of AR parametric noise model noise pixels representing a database noise template among the one or more database noise templates corresponding to the values of the AR parametric noise model parameters is computable based on a combination of a linear combination of previous noise pixels in a causal neighborhood of the AR parametric noise model noise pixel weighted by respective AR model linear combination parameters ($\varphi_1, \ldots, \varphi_P$) with a generated noise sample corresponding to an additive Gaussian noise of AR model variance parameter ($\sigma$) and using a seed parameter of a pseudo-random number generator.

9. The method according to claim 1,
wherein respective second autocovariance values for the database noise template are obtained for one or more of (Y, Cb, Cr) planes representing luminance or chrominance of pixels, and
wherein the entry of the noise model database is selected based on similarity estimates respectively representing, for each of the one or more of (Y, Cb, Cr) planes representing luminance or chrominance of pixels, a similarity between the one or more first autocovariance values and the one or more second autocovariance values.

10. An apparatus, comprising:
a processor, and a memory operatively coupled to the processor, the apparatus configured to perform an image processing method that comprises steps of:
determining, based on the image, one or more noise templates, each of the one or more noise templates including noise pixels representing noise contained in the image;
calculating one or more first autocovariance values, based on the noise pixels of at least one of the one or more noise templates;
based on the one or more first autocovariance values, selecting an entry of a noise model database among database entries which respectively comprise values of noise model parameters corresponding to a noise model;
using the values of the noise model parameters to characterize the noise contained in the image to be used for further processing of the image; and
obtaining, for each entry of the database to be searched, one or more second autocovariance values, based on noise pixels representing one or more database noise templates corresponding to the values of noise model parameters comprised in the entry,
wherein the one or more second autocovariance values are pre-calculated, and comprised in data stored in the entry.

11. A video encoder, configured to encode video content comprising a plurality of images, the video encoder comprising the apparatus according to claim 10, configured to process images of an input video.

12. The apparatus of claim 10, wherein the selecting the entry of the noise model database is based on a comparison of the one or more first autocovariance values with the one or more second autocovariance values.

13. A non-transitory computer-readable medium encoded with executable instructions which, when executed by an apparatus comprising a processor operatively coupled with a memory, causes the processor to perform an image processing method that comprises steps of:
determining, based on the image, one or more noise templates, each of the one or more noise templates including noise pixels representing noise contained in the image;
calculating one or more first autocovariance values, based on the noise pixels of at least one of the one or more noise templates;
based on the one or more first autocovariance values, selecting an entry of a noise model database among database entries which respectively comprise values of noise model parameters corresponding to a noise model;
using the values of the noise model parameters to characterize the noise contained in the image to be used for further processing of the image; and
obtaining, for each entry of the database to be searched, one or more second autocovariance values, based on noise pixels representing one or more database noise templates corresponding to the values of noise model parameters comprised in the entry,
wherein the one or more second autocovariance values are pre-calculated, and comprised in data stored in the entry.

14. The non-transitory computer-readable medium of claim 13, wherein the selecting the entry of the noise model database is based on a comparison of the one or more first autocovariance values with the one or more second autocovariance values.

* * * * *